May 27, 1924.　　　　　　　　　　　　　　　　　1,495,746
G. E. HULSE
REGULATING APPARATUS
Filed Oct. 19, 1920　　　　　2 Sheets-Sheet 1

Inventor
George E. Hulse
By his Attorneys

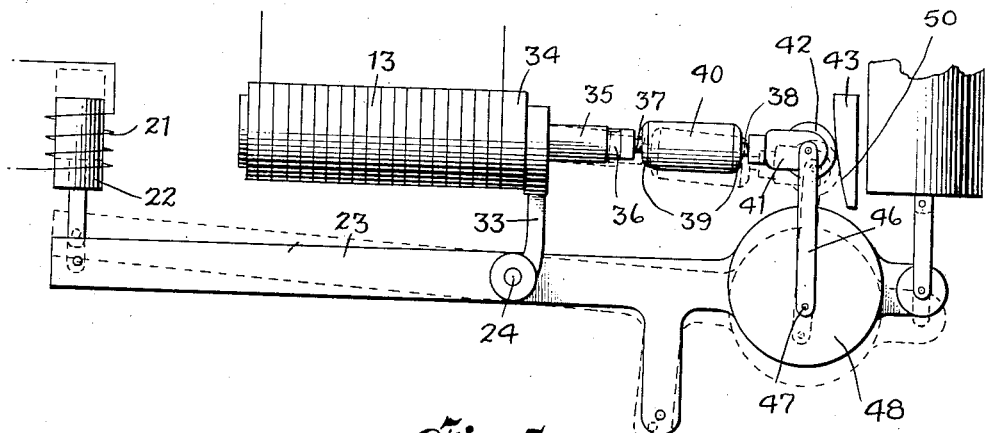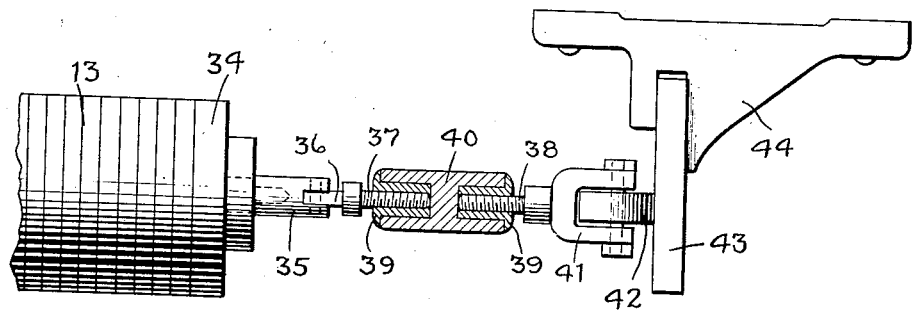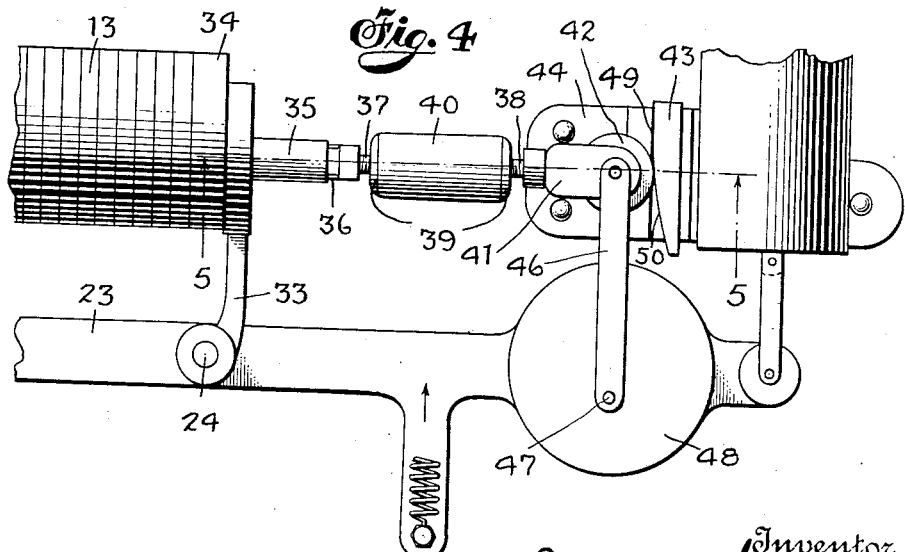

Patented May 27, 1924.

1,495,746

UNITED STATES PATENT OFFICE.

GEORGE E. HULSE, OF NEWARK, NEW JERSEY, ASSIGNOR TO THE SAFETY CAR HEATING & LIGHTING COMPANY, A CORPORATION OF NEW JERSEY.

REGULATING APPARATUS.

Application filed October 19, 1920. Serial No. 417,978.

*To all whom it may concern:*

Be it known that I, GEORGE E. HULSE, a citizen of the United States, and a resident of Newark, county of Essex, and State of New Jersey, have invented an Improvement in Regulating Apparatus, of which the following is a specification.

This invention relates to electrical systems of distribution, and more particularly to the regulating apparatus of such systems. One of the objects thereof is to provide a system of the above nature in which a maximum effective output is gained without sacrifice of efficient regulation to meet required conditions. Another object is to provide regulating apparatus characterized by inexpensive and practical construction and economical and effective action. Another object is to provide a simple device whereby with a given variation of regulating force any desired effect may be gained on the regulating element. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of various possible embodiments of this invention, Figure 1 is a diagrammatic plan of a system;

Figure 3 is a diagrammatic elevation of a regulating mechanism showing the parts on a larger scale;

Figure 4 is a similar view of a portion of the same mechanism on a larger scale; and Figure 5 is a sectional detail view along the line 5—5 of Figure 4.

Similar reference characters refer to similar parts throughout the several view of the drawings.

Figure 1:
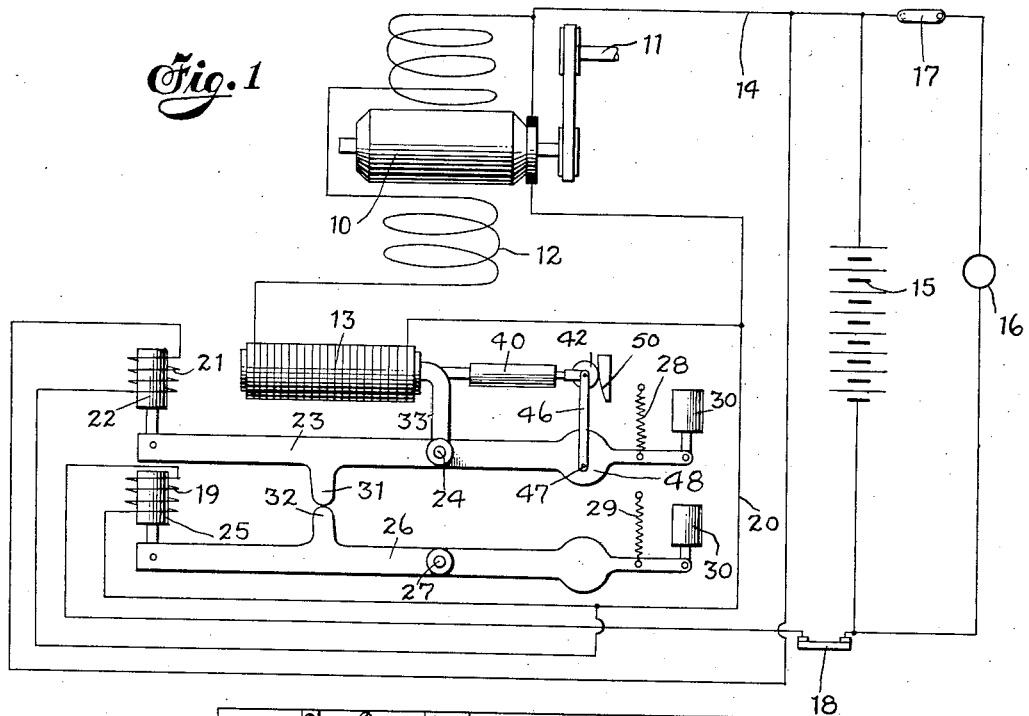

Referring now to Figure 1 of the drawings in detail, there is shown a generator 10 preferably driven from a car axle 11 by suitable pulleys and belts. This generator is provided with a shunt field winding 12 in which is serially disposed a pile of carbon disks 13, the aggregate resistance of which varies with pressure thereon. The external circuit of the generator leads through a main 14 to a storage battery 15 and lamps 16, the circuit of the lamps being controlled as by the hand switch 17. The external circuit is completed to the remaining pole of the generator through the ordinary automatic switch 18, series regulating coil 19 and the lead 20, as shown in the drawings.

A voltage regulating coil 21 is connected across the generator as shown and acts through a core 22 upon a lever 23 pivoted at 24. In like manner, the series regulating coil 19 acts through a core 25 on a lever 26 pivoted at 27. These cores are respectively retracted by the springs 28 and 29, the movement being retarded by the dash pots 30.

Levers 23 and 26 are respectively provided with lugs 31 and 32 diagrammatically indicated in Figure 1 of the drawings, these lugs serving upon the lever 26 being swung upwardly, to interlock and cause the levers to swing while thus interlocked as a single member, their axes being substantially aligned.

The movement of the lever 23 varies the pressure upon the carbon pile by the following mechanism:—As shown more clearly in Figure 3 of the drawings, there is mounted co-axially with the lever a swinging member 33 capable of movement independently of the lever 23 and bearing against a pressure plate 34. This lever has secured thereto a bifurcated stud 35 to which is jointed the end 36 of a screw 37. A similar screw 38 is provided with an oppositely disposed thread, and both of these screws are threaded within bushings 39 of a sleeve 40 which thus acts as a turn buckle and provides a means whereby the screws may be thrown apart or drawn together in an axial direction. The screw 38 is provided with a fork 41 within which is journaled a roller 42 bearing against a cam 43 suitably mounted within a bracket 44 on the base 45. There is thus provided a linkage interposed between the roller 42 and the pressure plate 34 which is adjustable in length and which may be swung in a vertical plane about the pivotal connection between the members 35 and 36. This swinging movement is brought about by a pair of links 46 pivoted at the axis of the roller 42 at their upper ends and extending parallel to a pivotal connection at 47 from a counter weight 48 formed in the lever. By selecting the point at which the pivotal connection 47 is made, the desired range and rate of movement of the roller may be achieved with a given movement of the lever 23. Also by a suitable conformation of the cam 43 as hereinafter explained, any desired variation in pressure upon the carbon pile may be gained with a given variation in force of the members acting upon the lever.

Figure 2:
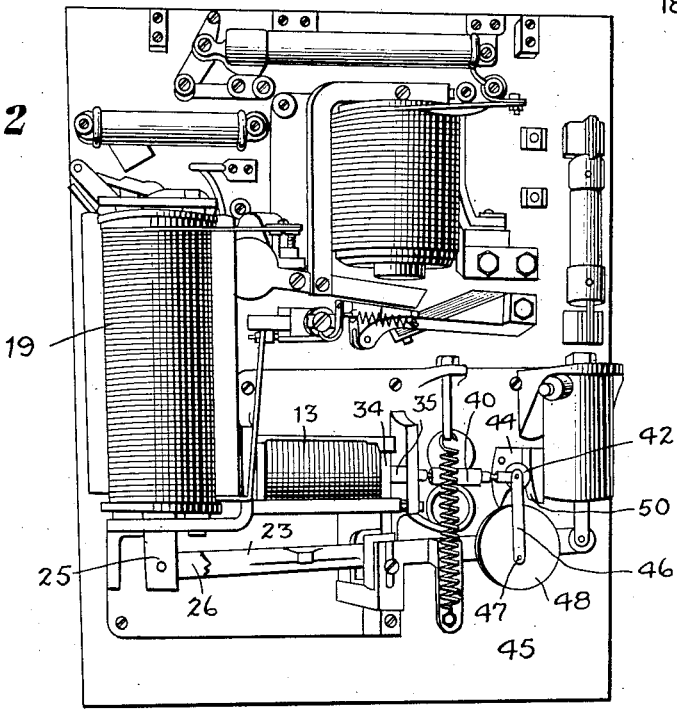
Figure 2 is a front elevation of a regulating and associated apparatus.

Referring briefly to Figure 2 of the drawings in which a preferred arrangement of parts is shown, the coil 19 is mounted vertically in front of the coil 21, and its core 25 and lever 26 are similarly disposed with respect to the corresponding parts associated with the voltage coil. In this view the lever 26 with its associated parts is broken away so as to disclose more clearly the construction of the lever 23 and parts associated with the latter. By this arrangement there is gained not only a compact disposition of the elements but any desired degree of magnetic inter-action between the two regulating coils. The arrangement furthermore permits the convenient mounting of the automatic switch 18 and its controlling parts on the same base 45.

Considering now the action of this apparatus, assume first the train to be stopped and the generator stationary, the automatic switch 18 is of course open to prevent back discharge of the battery. If now the train starts and the generator is driven, it is desirable that the generator attain a charging output, and in fact its full normal charging current, at as low a train speed as is practicable, and thus increase the total output. For this reason the generator should be, until this full output is attained, weakened or impeded to as slight a degree as is practicable. It may here be noted that the term "weakened" is used throughout in a broad sense to denote any action whereby the generator is restrained from delivering its maximum output for a given speed, this action being brought about in the present instance by the increase of resistance of the field to the carbon pile 13. At this stage this weakening is brought to an insignificant degree by extreme compression of the carbons, the latter result being achieved by the slight and almost negligible curvature of the portion 49 of the cam 43 when the roller is in its upper position approximated by the full line position of Figure 3 of the drawings. This conformation with a given force of the retracting spring acts as a thin wedge tending to drive the members of the carbon pile together. Furthermore, during the increase of current up to the point of its maximum proper load, it is desired to weaken the generator to as slight a degree as is practicable in order to allow such maximum to be attained at a low speed. This is gained by the conformation of the cam 43, for as the lever 23 and lever 26 pass through their early stages of upward swing, the roller 42 co-acting with the cam surface 49 is not permitted to travel toward the right (referring to Figure 4) to any material extent. The generator thus with a given rate of increase of speed of drive rapidly builds up toward its condition of maximum proper output at which point the roller 42 begins to co-act with the more sharply curved portion 50 of the cam 43. From this point and beyond, the regulation is such as to apply the proper corrective effect upon any tendency to excess of a function of the generator output. It may here be noted that the term "function" is used to denote a characteristic of the current such as its voltage or size. The regulation is thus maintained until the generator again slows down, whereupon the conformation of the cam above described tends to hold the current at or near its maximum safe output as long as this can be done, and ultimately applies a high pressure with a correspondingly low resistance to the carbon pile. When the battery approaches full charge, the magnets or coils are so chosen as to permit the lever 26 to swing out of interlocking relation with the lever 23 and thereafter the magnet 19 ceases its regulating action through this mechanical connection. The precise time at which the levers pass out of interlocking relation and the relative strengths of the magnets are so chosen as to give the most desirable form of charging curves to meet the various conditions of use. It may here be noted that the term "magnet" is used in a broad sense to cover constructions either of the fixed or movable core types.

It will thus be seen that there is provided apparatus in which the several objects of this invention are achieved and that the same is of essentially simple construction and readily capable of such formation of the parts as will attain the desired results in an effective and dependable manner.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:—

1. In apparatus of the class described, in combination, a generator, a storage battery adapted to be charged thereby, automatic means controlling the connection of said generator with said battery, means adapted to drive said generator at a variable speed, a variable resistance connected in the field of said generator, a movable member adapted upon movement thereof to vary said resistance, means continuously in operative relation with said member and tending during a predetermined range of speed of said generator to move said member to weaken said generator on increase of speed during charge of the battery, and means adapted to become effective during a range of speed below said predetermined range to render said last-mentioned means substantially ineffective.

2. In apparatus of the class described, in combination, a shunt wound generator, a storage battery adapted to be charged thereby, automatic means controlling the connection of said generator with said battery, a variable resistance connected with the field of said generator, an electromagnet having a field proportional to a function of the output of said generator, a member associated with said electromagnet and adapted to be moved thereby, means forming a positive connection between said member and said variable resistance adapted, upon the field of said magnet increasing its strength, to increase the effect of said variable resistance, and means adapted to render said electromagnet ineffective to increase the effect of said resistance when the speed of the generator is below that at which charging of the battery proceeds.

3. In apparatus of the class described, in combination, a generator, a storage battery adapted to be charged thereby, automatic means controlling the connection of said generator with said battery, means adapted to drive said generator at a variable speed, a carbon pile connected with the field of said generator, a movable member adapted upon movement thereof to vary the pressure on said carbon pile, means responsive to a function of the output of said generator and adapted to control the movement of said member to vary the pressure on said carbon pile, and means for confining the movement of said member to substantially two paths, one of which is such that, during decreases in speed of said generator down to a predetermined speed, said generator responsive means is effective to decrease, through said member, the pressure on said carbon pile and the other of which is such that, during decreases in speed below said predetermined speed of said generator, said generator responsive means is ineffective to decrease, through said member, the pressure on said carbon pile.

4. In apparatus of the class described, in combination, a source of current, a carbon pile connected to tend to vary the current from said source upon variation of pressure thereon, a device adapted upon movement to vary pressure on said carbon pile throughout a predetermined range of pressures, a magnet tending to move said device in one direction, retracting means tending to move said device in the opposite direction to compress said pile, and means adapted to cause said retracting means to move said device beyond said predetermined range as said magnet approaches de-energization whereby said carbon pile is under high compression with said magnet de-energized.

5. In apparatus of the class described, in combination, a shunt wound generator, a storage battery adapted to be charged thereby, a carbon pile connected in the field of said generator, a device tending to move throughout a predetermined range of movement in one direction to increase the pressure on said carbon pile throughout a substantially corresponding range of pressure, a magnet tending to move said device in the opposite direction, and means adapted to permit movement of said device beyond said predetermined range as said device moves in the first direction upon said magnet approaching de-energization.

6. In apparatus of the class described, in combination, a source of current, a pressure controlled variable resistance device adapted to control a function of current from said source, an electromagnet, a member having a surface of predetermined form, and means controlled by said magnet and co-acting with said surface and said resistance to exert a constantly applied pressure upon said resistance and to vary the pressure on said resistance at a rate governed by the conformation of said surface.

7. In apparatus of the class described, in combination, a source of current, a pressure controlled variable resistance adapted to control a function of current from said source, an electromagnet, and means including a cam cooperating with said electromagnet adapted to exert a constantly applied pressure on said resistance and to increase the pressure on said resistance at an increasing rate as said magnet weakens.

8. In apparatus of the class described, in combination, a source of current, a pressure controlled variable resistance adapted to control a function of current from said source, an electromagnet, and means including a cam cooperating with said electromagnet to increase the pressure on said resistance at an increasing rate as said magnet weakens, said cam being adapted to control said rate of variation of pressure in accordance with its shape and having a portion brought into action at high ranges of compression of said carbon pile which is shaped to give extremely small movement of the actuated parts with a considerable movement of the actuating parts.

9. In apparatus of the class described, in combination, a source of current, a carbon pile connected to control a function of the current from said source, means acting on said carbon pile to compress the same upon movement in one direction and relieve pressure thereon on movement in another direction, and an electromagnet connected to move said means in the second direction, said means comprising a cam having a surface which is substantially ineffective in relieving pressure on said carbon pile throughout the first range of attracting movement of the parts actuated by said magnet, and which relieves pressure at a materially more rapid rate throughout later ranges of such attracting movement.

10. In apparatus of the class described, in combination, a carbon pile, a pressure controlled variable resistance device, a member provided with a cam surface, an electromagnet, a device interposed between said cam surface and said pressure controlled resistance and adapted to be moved over said cam surface to vary the pressure on said resistance, and means controlled by said electromagnet adapted to move said device in a pressure relieving direction as the attraction of said magnet increases.

11. In apparatus of the class described, in combination, a pressure controlled variable resistance device, a stationary cam, a movable member one end of which is operatively related to said resistance and the other end of which travels over said cam, means adapted to adjust the effective length of said interposed member, and an electromagnet adapted to move said member over said cam.

12. In apparatus of the class described, in combination, a pressure controlled variable resistance, a current magnet, a voltage magnet, a lever controlled by one of said magnets, a lever controlled by the other of said magnets and adapted upon being actuated thereby to move into interlocking relation with said first lever, and means interposed between said first lever and said variable resistance adapted upon the same being moved by its respective magnet to decrease the pressure upon said resistance at an increasing rate as said movement progresses.

13. In apparatus of the class described, in combination, a pressure controlled variable resistance, a current magnet, a voltage magnet, a lever controlled by one of said magnets, a lever controlled by the other of said magnets and adapted upon being actuated thereby to move into interlocking relation with said first lever, and means interposed between said first lever and said variable resistance adapted upon the same being moved by its respective magnet to decrease the pressure upon said resistance at an increasing rate as said movement progresses, said last means comprising a cam and a device co-acting therewith to determine the rate of relief of said pressure.

14. In apparatus of the class described, in combination, a pressure controlled variable resistance, a current magnet, a voltage magnet, a lever controlled by one of said magnets, a lever controlled by the other of said magnets and adapted upon being actuated thereby to move into interlocking relation with said first lever, a cam, and means co-acting with said cam interposed between said first lever and said resistance to relieve pressure on said resistance as said first lever is moved by its magnet, said cam being shaped to give slight movement in a pressure-relieving direction at a high compression range of said resistance and substantial pressure-relieving movement for the same degree of movement of said first lever at the low compression range of said resistance.

15. In apparatus of the class described, in combination, a pressure controlled variable resistance, a current magnet, a voltage magnet, a lever controlled by said current magnet, a lever controlled by said voltage magnet, and adapted upon being actuated thereby to move into interlocking relation with said first lever, means interposed between said first lever and said variable resistance adapted upon the same being moved by its respective magnet to decrease the pressure upon said resistance at an increasing rate as said movement progresses, and springs tending to move said levers in opposition to said magnets.

16. In apparatus of the class described, in combination, a generator, a storage battery adapted to be charged thereby, automatic means controlling the connection of said generator with said battery, means adapted to drive said generator at a variable speed, a carbon pile, means co-acting with said carbon pile tending to weaken said generator on increase of speed during the charge of the battery comprising a magnet tending to relieve the pressure thereon, retracting means tending to oppose said magnet, and means adapted to permit said retracting means to vary the pressure throughout a predetermined range of pressures during charge of the battery and throughout an extended range of pressure as said magnet approaches de-energization whereby said carbon pile is under high compression with said magnet de-energized.

17. In apparatus of the class described, in combination, a generator, a storage battery adapted to be charged thereby, automatic means controlling the connection of said generator with said battery, means adapted to drive said generator at a variable speed, a pressure controlled variable resistance device adapted to control a function of the current from said generator, an electromagnet, a member having a surface of predetermined form, and means controlled by said magnet and co-acting with said surface and said resistance to vary the pressure on said resistance at a rate governed by the conformation of said surface.

In testimony whereof, I have signed my name to this specification this eighth day of October, 1920.

GEORGE E. HULSE.